United States Patent [19]
Edwards

[11] Patent Number: 5,534,796
[45] Date of Patent: Jul. 9, 1996

[54] SELF-CLOCKING PIPELINE REGISTER

[75] Inventor: Stephen W. Edwards, Madison, Ala.

[73] Assignee: Intergraph Corporation, Huntsville, Ala.

[21] Appl. No.: 427,076

[22] Filed: Apr. 21, 1995

[51] Int. Cl.[6] ............................................. H03K 19/096
[52] U.S. Cl. ............................................ 326/93; 327/141
[58] Field of Search .................................. 326/93, 95, 98; 327/141

[56] References Cited

U.S. PATENT DOCUMENTS

| 5,142,556 | 8/1992 | Ito | 327/141 |
| 5,373,204 | 12/1994 | Muramatsu et al. | 326/93 |
| 5,389,838 | 2/1995 | Orengo | 326/93 |
| 5,410,550 | 4/1995 | Simmons et al. | 326/93 |
| 5,434,520 | 7/1995 | Yetter et al. | 326/93 |

*Primary Examiner*—Edward P. Westin
*Assistant Examiner*—Benjamin D. Driscoll
*Attorney, Agent, or Firm*—Bromberg & Sunstein

[57] ABSTRACT

A control module for controlling a data register, a self-clocking data register controlled by such a module and a pipeline of self-clocked pipeline registers. The localized control module includes a flip-flop for indicating whether the data register being controlled is occupied or vacant. Each module includes state machine logic for generating an enable output to the pipeline register when the flip-flop indicates the register was vacant and a load signal indicating data is available for loading into the register has been received. The localized control may be further modified to provide look-ahead in which an enable output is also generated when a load signal has been received and an unload signal has been received.

22 Claims, 5 Drawing Sheets

SELF-CLOCKING PIPELINE REGISTER

BACKGROUND OF THE INVENTION

The present invention is directed to pipeline registers, in particular, a module which provides localized control of pipeline registers.

Digital circuits are becoming increasingly complex. Arrays are currently available in sizes and geometries that were unheard of just a few years ago. Circuit requirements for applications have rapidly increased in scope and features.

For the most part, the increase in the size of the circuit medium has given the designer greater flexibility, allowed for more creativity and provided the opportunity to implement a richer set of features in a design. However, such larger circuits require more complex state machines to control the added functionality. Even for most experienced designers, it doesn't take more than a few tens of states in a state machine before it becomes conceptually unmanageable. The probability that not all required states are covered as planned and the existence of "gotcha" states increases drastically as the number of states increases.

SUMMARY OF THE INVENTION

The present invention is directed to a localized control module to control a data register or a single stage of a pipeline. A data register for use in a pipeline of registers and logic nodes is referred to herein as a pipeline register. The control module includes a flip-flop for indicating whether the data register being controlled is occupied or vacant. State machine logic accompanies the flip-flop to generate an enable output to the data register when the flip-flop indicates that the register is vacant and there is a signal to be loaded. Increased throughput can be provided by adding a look-ahead component to the state machine logic in the localized control module. To achieve look-ahead, the control module includes a line for receiving an unload signal indicating that the data register is being unloaded. Then, the state machine logic may also generate an enable output to the data register when a load signal indicates the register is to be loaded with new data and the unload signal is received indicating that the register is being unloaded of its current data. The enable output from the control module may be provided to a complete stage of data registers. For example, a stage may include a sixteen bit register or sixteen single bit registers. A pipeline may be a succession of stages each having a sixteen bit register. A periodic clock signal synchronizes the activity throughout the digital circuit.

The present invention advantageously provides a means to reduce the complexity of state machines by offloading some of the general control to localized control. In a circuit design, high level control is not always necessary for all data registers. The use of a localized control module of an embodiment of the invention can take care of such registers in a digital circuit design and thereby simplify the requirements placed on the high level control. The combination of a localized control module and a data register provides a self-clocking pipeline register. The self-clocking pipeline registers of the invention may be used to simplify digital circuit design.

DETAILED DESCRIPTION OF THE PREFERRED EMBODIMENTS

Figure 1:
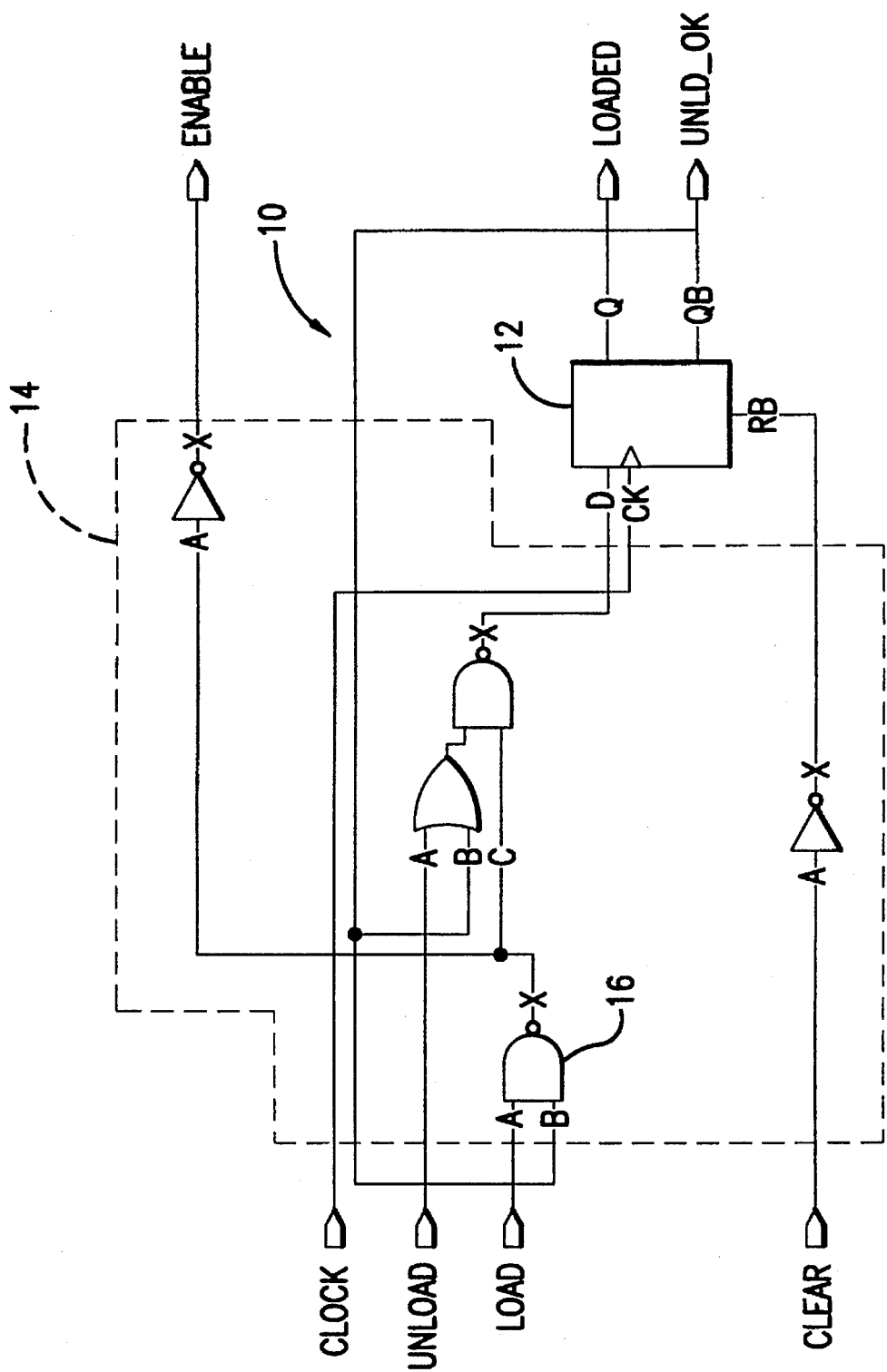
FIG. 1 is a schematic diagram of a control module of an embodiment of the invention.

Referring now to the drawings, a schematic diagram of a localized control module 10 of the invention without look-ahead is illustrated in FIG. 1. A flip-flop 12 is included for indicating whether the register being controlled is occupied or vacant. The output signal identified by the term "loaded" provides the indication of whether the register is occupied or vacant. In the illustrated embodiment, if the register is occupied, loaded is a high signal. If the register is vacant, loaded is a low signal. State machine logic 14 accompanies the flip-flop 12 to produce an enable signal. The enable signal is directed to the register being controlled and enables it to receive new data from the previous stage. The state machine logic 14 receives a load signal which indicates that data is available for loading into the data register being controlled. An enable signal output is issued by the state machine logic when the flip-flop indicates that the register is vacant and the load signal has been received.

A periodic clock signal is provided to the control module so as to synchronize the control functions. A clear signal is provided to permit resetting the circuitry by clearing of the contents of the flip-flop 12. AND gate 16 is provided in the state machine logic to receive the load signal and to receive the loaded signal from the flip-flop 12. The AND gate 16 generates the enable signal.

The state machine logic is also used to control the flip-flop 12. If the data register is receiving the enable signal to load new data, then the flip-flop 12 will be caused to have a loaded signal to indicate the data register is occupied. Otherwise, the unload signal is considered. The unload signal indicates that data in the data register being controlled is being unloaded into the next stage. If the unload signal is received by the state machine logic and the enable signal is not being issued, then the loaded signal of the flip-flop will be caused to indicate the data register is vacant. The value of the loaded signal is determined on the rising edge of the clock. The "unld_ok" signal is the inverse of the loaded signal. In summary, the state machine logic 14 controls the flip-flop 12 so that the loaded signal is high when the data register is occupied and the loaded signal is low when the data register is vacant.

A pipeline of registers controlled by the module of FIG. 1 would require a bubble or vacancy between each data bit being transferred along the pipeline. Data could not be passed from one register to the next unless the following register were vacant. In order to provide a higher throughput, a control module with look-ahead is provided in FIG. 2.

Figure 2:
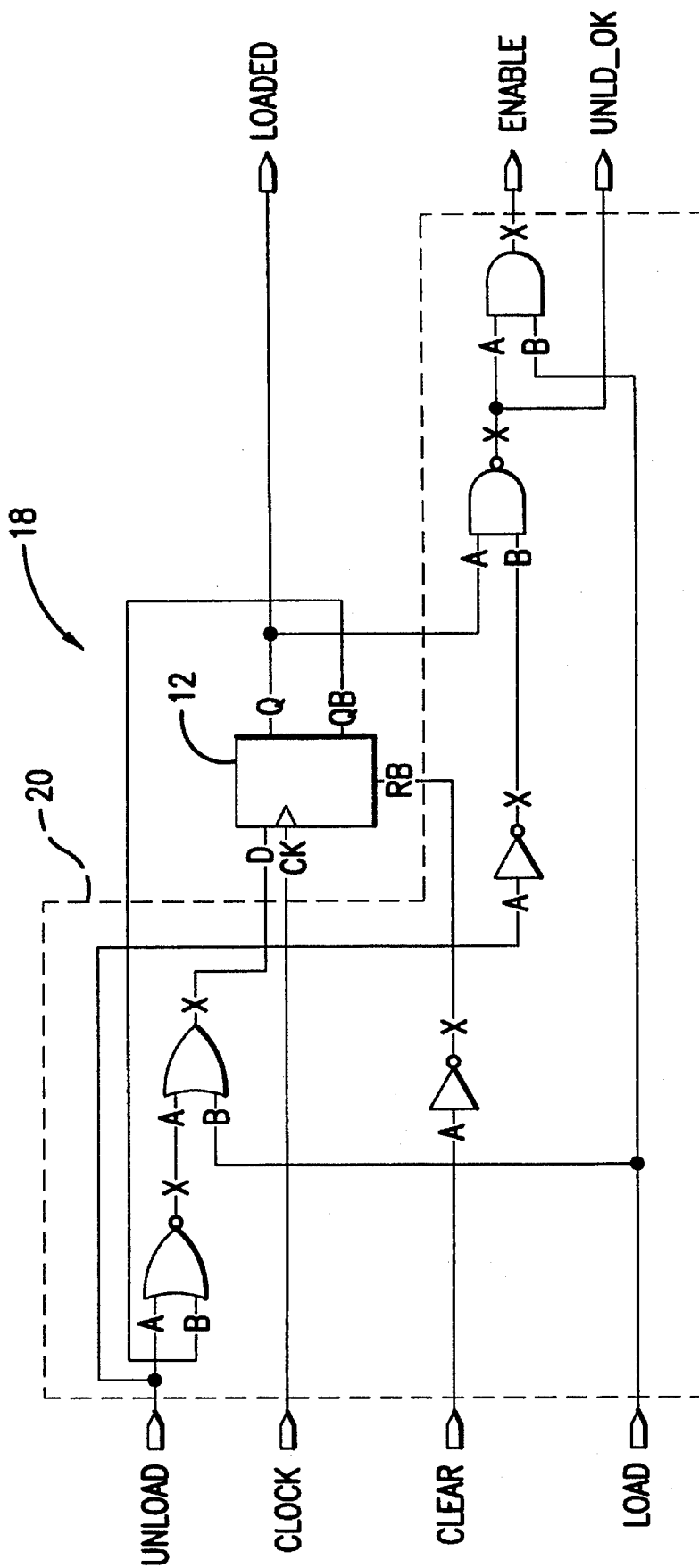
FIG. 2 is a schematic diagram of an alternate embodiment of a control module of the invention.

The control module 18 of FIG. 2 includes the flip-flop 12 for indicating whether the register being controlled is occupied or vacant. An alternative state machine 20 is provided to achieve the look-ahead function. In accordance with the look-ahead control module 18, the state machine 20 generates the enable signal not only when the register is unoccupied and the load signal is being received, but also when the data register is being unloaded and the load signal is being received. Thus, with look-ahead, data may enter and leave a data register in the same clock cycle. The state machine has also revised the control of the flip-flop 12. In the look-ahead control module 18, anytime the load signal is being received, the flip-flop 12 will be switched to indicate that the data register is occupied. If the data register is not being loaded, then the state machine considers whether it is being unloaded. When it is unloaded and not being loaded, then the flip-flop 12 is set to a vacant state. The state machine logic 20 receives a periodic clock signal for synchronizing the movement of data from one data register to a next register or node. A node may be any kind of combinatorial logic. A clear signal is connected to the flip-flop 12 so that it may be cleared to reset it to the vacant state. The unld_ok signal is active whenever the flip-flop 12 indicates that the data register is vacant, or if unload is asserted.

Figure 3:
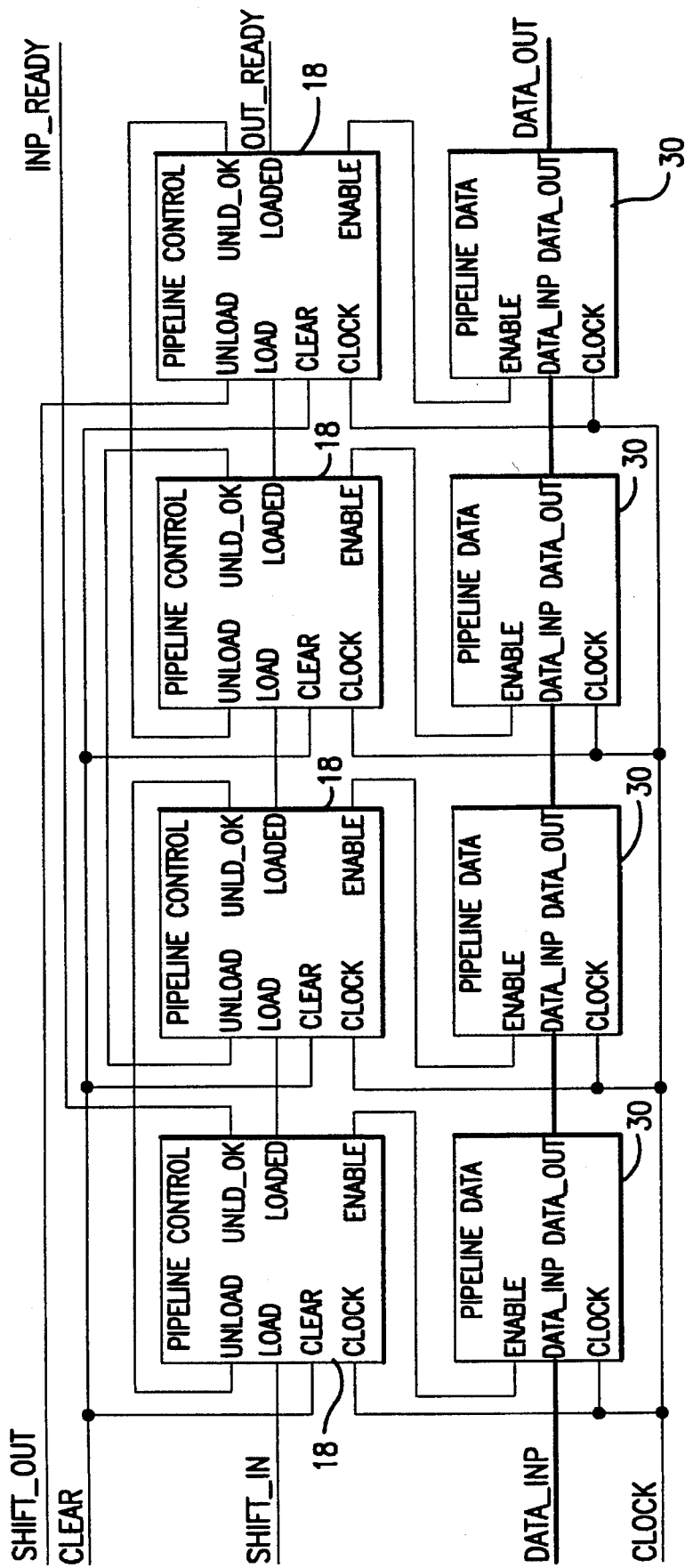
FIG. 3 is a schematic block diagram of a data pipeline of the invention using the control modules of FIG. 2.

Referring now to FIG. 3, it can be seen how the control modules may be used in a pipeline. The pipeline of FIG. 3 is a four-stage ripple FIFO. Each register is subject to the self-clocking control of a look-ahead control module 18. The look-ahead control modules are connected so as to provide look-ahead across all four of the stages in the data pipeline. Advantageously, an external higher level state machine is not required to control to movement of data through this pipeline. Each stage of data registers is indicated by the block entitled pipeline data 30. The pipeline data 30 may be a single bit register or a multiple bit data register, for example, a sixteen bit register. Each stage of data registers is controlled by the enable signal coming from its associated control module 18. A shift out signal is connected as the unload signal to the last in this series of four stages in the data pipeline. The unld_ok signal of each control module is tied back to the unload signal of a previous control module. Unld_ok is asserted whenever the data register being controlled is vacant or about to be unloaded. By successively tying back the unld_ok signals, it is made possible for the four data registers in the data pipeline to move data from one to the next simultaneously in a clock signal. When a data register is occupied, the loaded signal from the flip-flop 12 of the control module controlling that data register is provided forward to the control module for the next data register. It is received by the following control module as a load signal. If there are any vacant stages in the four-stage ripple FIFO and the shift out signal is not asserted, the vacant stages will fill in with data from preceding stages.

Figure 4:
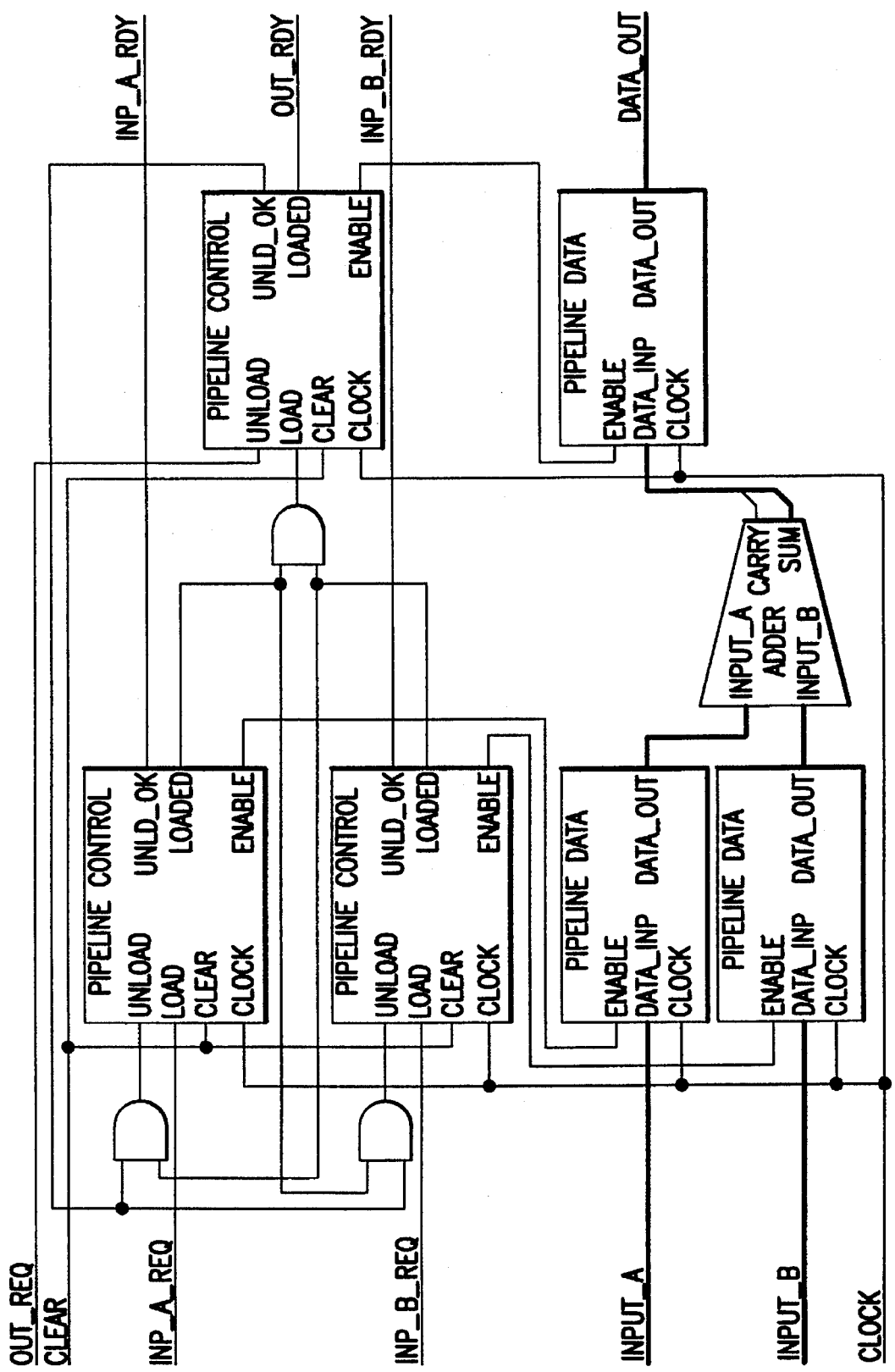
FIG. 4 is a schematic block diagram of a registered adder employing the control modules of FIG. 2.

FIG. 4 illustrates a pipeline adder. There are two pipeline input stages in parallel which provide the two inputs to an adder. The added result is provided to a pipeline output stage. In addition to the localized control modules, additional control logic is required because the output register cannot be loaded until both input registers are occupied, and either input register cannot be unloaded until the opposite input register is occupied and the output register is vacant or ready to unload. This extra logic amounts to three two input AND gates.

Figure 5:
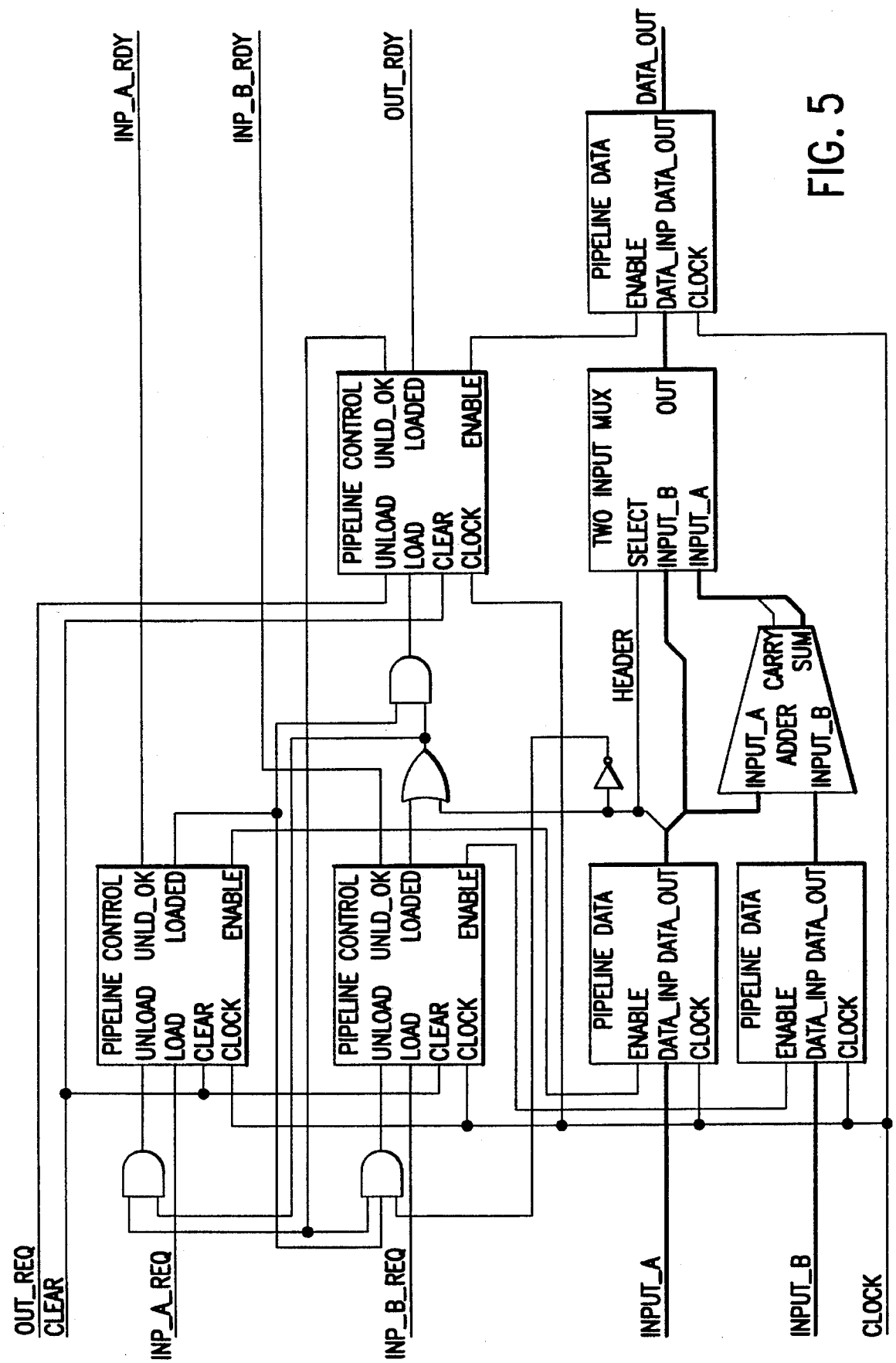
FIG. 5 is a schematic block diagram of a registered adder/multiplexor employing the local control modules of FIG. 2.

FIG. 5 illustrates an enhanced version of the pipeline adder in that a multiplexor has been added to the circuit. The multiplexor provides the option of bypassing the adder if the A input register has "header" data. In this case, the header data is passed on directly to the output register without affecting the B input register. Header data is indicated using an extra bit in the data register itself. The polarity of the extra bit in register A determines whether there is a header in register A or not. For example, if the data to be added is sixteen bits, register A would have an extra bit, bit seventeen, that would indicate header data (if on) or addend data (if off). The output register would also have this extra bit.

The control modules of the present invention advantageously provide localized control of data registers thereby unburdening the high level control with the performance of these control functions.

Of course, it should be understood that various changes and modifications to the preferred embodiments described will be apparent to those skilled in the art. For example, the arrangement and selection of logic gates for achieving localized control within a state machine can be changed in many ways within the scope of the invention to satisfy the needs of a particular design. In addition, the use of localized control for a data register may be used in the context of countless digital circuit applications. These and other changes can be made without departing from the spirit and scope of the invention and without diminishing its attendant advantages. It is therefore intended that such changes and modifications be covered by the following claims.

I claim:

1. A module for controlling a pipeline register comprising:
   a flip-flop for indicating whether the pipeline register is occupied or vacant;
   load means for receiving a load signal when data is available for loading into the pipeline register; and
   state machine logic responsive to said flip-flop and said load means so as to generate an enable output to the pipeline register when said flip-flop indicates vacant and said load means has received a load signal.

2. The module of claim 1 further comprising a clock to provide a periodic clock signal.

3. The module of claim 2 wherein said flip-flop is connected so as to switch from vacant to occupied on clock signal when said flip-flop was initially vacant and said load means has received a load signal.

4. The module of claim 2 further comprising unload means for receiving an unload signal indicating that the pipeline register is being unloaded.

5. The module of claim 4 wherein said flip-flop is connected so as to switch from occupied to vacant upon a clock signal when said unload means has received an unload signal.

6. The module of claim 4 wherein said state machine logic also generates an enable output to the pipeline register when said load means has received a load signal and said unload means has received an unload signal.

7. The module of claim 4 wherein said flip-flop is connected so as to indicate occupied upon a clock signal when said load means has received a load signal.

8. A self-clocking pipeline register comprising:
   a data register connected to receive data in response to an enable signal;
   a flip-flop for indicating whether said data register is occupied or vacant;
   load means for receiving a load signal when data is available for loading into said data register; and
   state machine logic connected to said flip-flop and said load means and having an output connected to said data register so as to generate the enable signal on the output when said flip-flop indicates vacant and said load means has received a load signal.

9. The pipeline register of claim 8 further comprising a clock to provide a periodic clock signal.

10. The pipeline register of claim 9 wherein said flip-flop is connected so as to switch from vacant to occupied upon a clock signal when said flip-flop was initially vacant and said load means has received a load signal.

11. The pipeline register of claim 9 wherein said data register comprises a multi-bit data register.

12. The pipeline register of claim 9 further comprising unload means for receiving an unload signal indicating that said data register is being unloaded.

13. The pipeline register of claim 12 wherein said flip-flop is connected so as to switch from occupied to vacant upon a clock signal when said unload means has received an unload signal.

14. The pipeline register of claim 12 wherein said state machine logic also generates an enable signal when said load means has received a load signal and said unload means has received an unload signal.

15. The pipeline register of claim 12 wherein said flip-flop is connected so as to indicate occupied upon a clock signal when said load means has received a load signal.

16. A data pipeline comprising:
a plurality of stages of data registers each stage connected to receive data in response to an enable signal;
a plurality of flip-flops each connected to one of said stages of data registers for indicating whether the respective stage is occupied or vacant;
a plurality of load means each coupled to one of said flip-flops for receiving a load signal when data is available for loading into the respective stage; and
a plurality of state machines each connected to one of said flip-flops and the respective load means and having an output connected to the respective stage so as to generate the enable signal on the output when said one of said flip-flops indicates vacant and the respective load means has received a load signal.

17. The data pipeline of claim 16 further comprising a clock to provide a periodic clock signal.

18. The data pipeline of claim 17 wherein each of said flip-flops is connected so as to switch from vacant to occupied upon a clock signal when said flip-flop was initially vacant and the respective load means has received a load signal.

19. The data pipeline of claim 17 further comprising a plurality of unload means each coupled to one of said flip-flops for receiving an unload signal indicating that the respective stage is being unloaded.

20. The data pipeline of claim 17 wherein at least one of said flip-flops is connected so as to switch from occupied to vacant upon a clock signal when the respective unload means has received an unload signal.

21. The data pipeline of claim 17 wherein at least one of said state machines also generates an enable signal when the respective load means has received a load signal and the respective unload means has received an unload signal.

22. The data pipeline of claim 17 wherein at least one of said flip-flops is connected so as to indicate occupied upon a clock signal when the respective load means has received a load signal.

* * * * *